US011599325B2

(12) United States Patent
Noyes et al.

(10) Patent No.: US 11,599,325 B2
(45) Date of Patent: Mar. 7, 2023

(54) SYSTEMS AND METHODS FOR SYNCHRONIZING GRAPHICAL DISPLAYS ACROSS DEVICES

(71) Applicant: Bluebeam, Inc., Pasadena, CA (US)

(72) Inventors: Peter Noyes, Sunland, CA (US); Jonathan Rothberg, Pasadena, CA (US)

(73) Assignee: Bluebeam, Inc., Pasadena, CA (US)

( * ) Notice: Subject to any disclaimer, the term of this patent is extended or adjusted under 35 U.S.C. 154(b) by 0 days.

(21) Appl. No.: 16/239,044

(22) Filed: Jan. 3, 2019

(65) Prior Publication Data

US 2020/0218490 A1 Jul. 9, 2020

(51) Int. Cl.
*G06F 3/14* (2006.01)
*G06F 40/197* (2020.01)
*H04L 67/01* (2022.01)
*H04L 67/55* (2022.01)

(52) U.S. Cl.
CPC .......... *G06F 3/1454* (2013.01); *G06F 40/197* (2020.01); *H04L 67/01* (2022.05); *H04L 67/55* (2022.05)

(58) Field of Classification Search
CPC ...... G06F 3/1454; G06F 40/197; G06F 17/24; G06F 17/2288; G06F 17/2264; G06F 17/2247; G06F 17/227; H04L 67/26; H04L 67/42; H04L 67/01; H04L 67/55
See application file for complete search history.

(56) References Cited

U.S. PATENT DOCUMENTS

| | | | |
|---|---|---|---|
| 6,463,440 B1* | 10/2002 | Hind | G06F 40/143 707/999.102 |
| 7,353,252 B1 | 4/2008 | Yang et al. | |
| 8,131,815 B1* | 3/2012 | Perelman | G06F 40/174 709/217 |
| 10,445,414 B1* | 10/2019 | Grieve | G06F 40/197 |
| 11,030,242 B1* | 6/2021 | Borthakur | G06F 16/951 |
| 2003/0093757 A1 | 5/2003 | Silverbrook et al. | |
| 2003/0137522 A1* | 7/2003 | Kaasila | G06F 16/9577 345/619 |
| 2003/0182578 A1* | 9/2003 | Warnock | G06K 9/00469 713/176 |

(Continued)

OTHER PUBLICATIONS

International Search Report and Written Opinion dated Mar. 20, 2020, in corresponding International Application No. PCT/US2019/068779 (8 pages).

(Continued)

*Primary Examiner* — Thu V Huynh
(74) *Attorney, Agent, or Firm* — Bookoff McAndrews, PLLC

(57) ABSTRACT

Systems and methods are disclosed for synchronizing a document markup modification across a plurality of devices. One method comprises subscribing to one or more events occurring in a first document markup application and receiving a notification indicating a modification to a document markup in the first document markup application. A markup object associated with the modified document markup may be extracted and translated to a cross-compatible markup object. The cross-compatible markup object is transmitted to a second document markup application to be rendered and displayed to a user.

20 Claims, 9 Drawing Sheets

(56) References Cited

U.S. PATENT DOCUMENTS

| | | | |
|---|---|---|---|
| 2004/0073873 A1* | 4/2004 | Croney | G06T 3/4092 |
| | | | 715/273 |
| 2004/0139400 A1* | 7/2004 | Allam | G06F 40/106 |
| | | | 715/201 |
| 2006/0026502 A1 | 2/2006 | Dutta | |
| 2006/0168512 A1* | 7/2006 | Wilson | H04L 67/04 |
| | | | 715/742 |
| 2007/0143700 A1* | 6/2007 | Fukada | G06F 21/84 |
| | | | 715/768 |
| 2008/0235573 A1* | 9/2008 | Serdy | G06F 16/9577 |
| | | | 715/239 |
| 2009/0019015 A1* | 1/2009 | Hijikata | G06F 16/951 |
| 2009/0132907 A1* | 5/2009 | Shao | G06F 40/143 |
| | | | 715/234 |
| 2009/0217150 A1* | 8/2009 | Lin | G06Q 10/10 |
| | | | 715/232 |
| 2010/0083135 A1* | 4/2010 | Zawacki | H04L 12/1822 |
| | | | 715/753 |
| 2011/0258535 A1* | 10/2011 | Adler, III | G06F 40/109 |
| | | | 715/235 |
| 2012/0072854 A1 | 3/2012 | Zhou | |
| 2013/0047072 A1* | 2/2013 | Bailor | G06F 40/169 |
| | | | 715/234 |
| 2013/0232149 A1* | 9/2013 | Smith | G06F 16/972 |
| | | | 707/740 |
| 2014/0006919 A1* | 1/2014 | He | G06F 40/169 |
| | | | 715/230 |
| 2014/0032677 A1 | 1/2014 | Pittenger et al. | |
| 2014/0053227 A1* | 2/2014 | Ruppin | H04L 67/06 |
| | | | 726/1 |
| 2014/0208193 A1* | 7/2014 | Parmar | G06F 3/0486 |
| | | | 715/205 |
| 2015/0078247 A1 | 3/2015 | Maharajh et al. | |
| 2016/0062964 A1* | 3/2016 | Choi | G06F 16/958 |
| | | | 715/234 |
| 2016/0225071 A1* | 8/2016 | Breen | G06Q 40/02 |
| 2016/0320948 A1* | 11/2016 | McLeod | G06Q 10/10 |
| 2017/0277696 A1* | 9/2017 | Sekharan | H04L 65/403 |
| 2017/0329863 A1* | 11/2017 | Metz | G06F 16/84 |
| 2018/0032493 A1* | 2/2018 | Raleigh | G06F 40/134 |
| 2018/0253406 A1* | 9/2018 | Lin | G06F 16/955 |

OTHER PUBLICATIONS 131.180.112.41: "PDF", Jan. 2, 2019 (Jan. 2, 2019), XP055949969, Retrieved from the Internet: URL:https://en.wikipedia.org/w/index.php?title=PDF&oldid=876478008 [retrieved of Aug. 9, 2022].

Extended European Search Report dated Aug. 19, 2022, in counterpart European Patent Application No. 19907992.2 (11 pages, in English).

* cited by examiner

```
<<
  /BS <<
      /S /S
      /Type /Border
      /W 1
  >>
  /C [
    1
    0
    0
  ]
  /CreationDate (D:20181005103535-07'00')
  /F 4
  /M (D:20181005125119-07'00')
  /NM (LXRADSDYFUHWOFGX)
  /RD [
    0.5
    0.5
    0.5
    0.5
  ]
  /Rect [
    107.5
    107.5
    198.5
    198.5
  ]
  /Subj (Ellipse)
  /Subtype /Circle
  /T (pnoyes)
>>
```
10A

```
{
  "author": "pnoyes",
  "contents": "",
  "creationDate": "2018-10-05T10:35:35-07:00",
  "hidden": false,
  "lock": false,
  "modDate": "2018-10-05T12:51:19-07:00",
  "name": "LXRADSDYFUHWOFGX",
  "noRotate": false,
  "noView": false,
  "noZoom": false,
  "opacity": 1,
  "print": true,
  "readOnly": false,
  "rect": [
    107.5,
    107.5,
    198.5,
    198.5
  ],
  "strokeColor": [
    "RGB",
    1,
    0,
    0
  ],
  "subject": "Ellipse",
  "toggleNoView": false,
  "type": "Circle",
  "reactDiff": [
    0.5,
    0.5,
    0.5,
    0.5
  ],
  "width": 1,
  "style": "S",
  "fillColor": [],
}
```
70A

FIG. 7

SYSTEMS AND METHODS FOR SYNCHRONIZING GRAPHICAL DISPLAYS ACROSS DEVICES

TECHNICAL FIELD

The present disclosure relates to systems and methods for synchronizing graphical displays across a plurality of devices. More particularly, the present disclosure relates to systems and methods for synchronizing a document markup modification across a plurality of devices. The present disclosure further relates to systems and methods for synchronizing a document markup modification between a thin client application and a thick client application.

BACKGROUND

Creation, distribution, and management of information is at the core of modern day business. Many different ways of presenting information have been developed, including word processing documents, spreadsheets, graphics, photographs, design drawings and plans, and so forth. This information content may be generated using a specific software application. In an enterprise setting, multiple individuals may collaborate on creating, reviewing, editing, and/or deleting such information content. Due to advancement in high-speed data communications and computing devices, such collaboration may involve remote users dynamically viewing and making changes to information content, by exchanging pertinent data among each other in real-time.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for synchronizing a document markup modification across a plurality of devices, comprising: subscribing to one or more events occurring in a first document markup application; receiving a notification indicating a modification to a document markup in the first document markup application; extracting a markup object associated with the modified document markup; translating the markup object to a cross-compatible markup object; and transmitting the cross-compatible markup object to a second document markup application.

One embodiment provides a system for synchronizing a document markup modification across a plurality of devices. The system may comprise one or more processors; and a non-transitory computer readable medium storing instructions which, when executed by the one or more processors, cause the one or more processors to perform a method comprising: subscribing to one or more events occurring in a first document markup application; receiving a notification indicating a modification to a document markup in the first document markup application; extracting a markup object associated with the modified document markup; translating the markup object to a cross-compatible markup object; and transmitting the cross-compatible markup object to a second document markup application.

One embodiment provides a non-transitory computer readable medium for synchronizing a document markup modification across a plurality of devices. The non-transitory computer readable medium may store instructions that, when executed by one or more processors, cause the one or more processors to perform a method comprising: subscribing to one or more events occurring in a first document markup application; receiving a notification indicating a modification to a document markup in the first document markup application; extracting a markup object associated with the modified document markup; translating the markup object to a cross-compatible markup object; and transmitting the cross-compatible markup object to a second document markup application.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 depicts an exemplary markup object and a corresponding exemplary cross-compatible markup object, according to one aspect of the present disclosure.

DETAILED DESCRIPTION OF EMBODIMENTS

Figure 1:
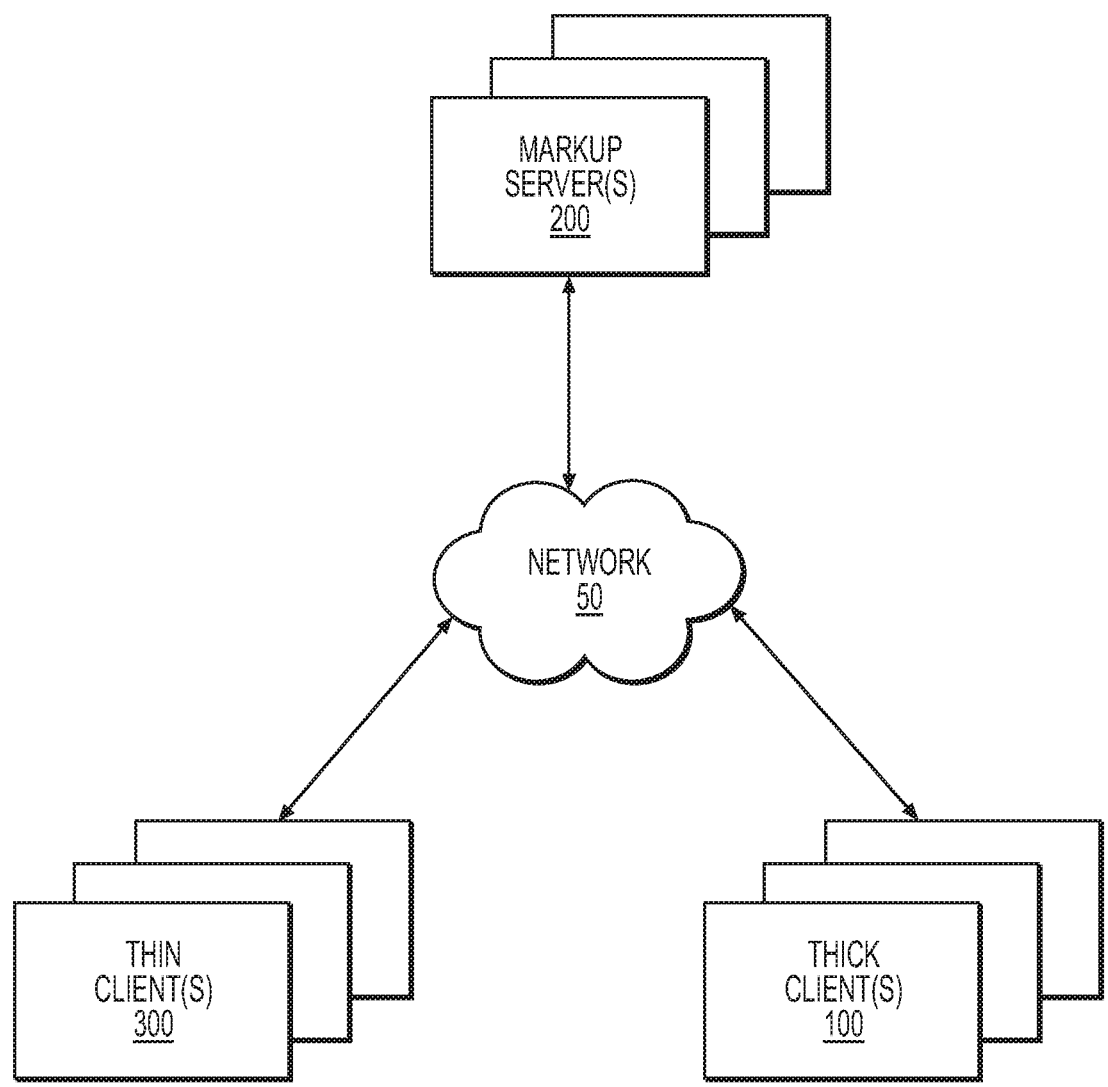
FIG. 1 depicts an exemplary system infrastructure of communicatively coupled thick client(s), markup server(s), and thin client(s), according to one aspect of the present disclosure.

The following embodiments describe systems and methods for synchronizing a document markup modification across a plurality of devices and, more particularly, for synchronizing a document markup modification between a thin client application and a thick client application.

Due to the existence of different computing platforms employing a variety of operating systems, application programs, and processing and graphic display capabilities, device-independent file formats, such as the Portable Document Format (PDF), have been developed to facilitate information exchange among different computing platforms. The PDF standard is a combination of a number of technologies, including a simplified PostScript interpreter subsystem, a font embedding subsystem, and a storage subsystem. PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated in a single file. The graphical elements are not necessarily encoded to a specific operating system, software application, or hardware, but may be designed to be rendered in the same manner regardless of the specifications of the system writing or reading such data. The cross-platform capability of PDF aided its widespread adoption, and it is now a de facto document exchange standard. Although originally proprietary, PDF has been released as an open standard published by the International Organization for Standardization (ISO) as ISO/IEC 32000-2:2017. Currently, PDF is utilized to encode a wide variety of document types, including those composed largely of text, and those composed largely of vector and raster graphics.

One of several improvements that have been made since the initial release of the PDF format is support for adding markups to a base document. The markups are graphically overlaid on the underlying document, with various properties being precisely controlled by the user. Thus, the functionality is similar to graphical illustration/design and image manipulation applications where various objects can be positioned on a document canvas by navigating a cursor to a desired location and providing a subsequent input to make placement permanent. Before positioning the markup, the type of the markup may be selected (e.g., text box, line, polygon, note, ink, etc.).

One way to develop collaborative document editing applications based on documents encoded in the PDF format to enable remote users to collaboratively manipulate markups within PDF documents is to create and utilize markup objects representative of modified markups, in order to propagate or synchronize the modified markups across user devices during collaborative sessions. The markup objects may be PDF dictionary objects extracted from PDF document files, each containing a set of key-value pairs that describe the attributes of the markup. Such a markup object (i.e., a PDF dictionary object) may also be referred to as a PDF markup object (in the sense that the markup object may be in PDF format), standard markup object (in the sense that the markup object may be in ISO-standardized format), a native markup object (in the sense that the markup object may be extracted from a PDF file and maintained as a PDF dictionary object), and/or a proprietary or custom markup object (in the sense that the extraction and/or formation of the markup object may be performed according to a schema specific to or customized to an organization such as a company). Due to the nuances and complexity involved with processing markup objects, a substantial amount of processing may be necessary at the recipient user's device to properly render and display the modified markups based on the markup objects. Therefore, collaborative PDF markup editing may require installation on a computer system having a substantial processing and storage capability (e.g., thick client), of an application specifically designed to manage collaborative sessions as well as process/interpret PDF markup objects in their native format. With the proliferation of computing device types with varying computing resources, computing devices with limited capabilities such as, for example, thin clients, may lack the necessary computing power or storage to install and run such an application. Furthermore, devices other than conventional desktop computers such as, mobile phones, tablets, gaming consoles, etc., may not be well suited for such an application.

Therefore, there is a need for an open, more ubiquitous and accessible format for markups, that is suitable for consumption by various client types and applications. Further, there is a need for a mechanism that enables markup collaboration across different platforms, and for avoiding duplicity of effort at clients for rendering markups.

One disclosed embodiment is directed to propagating a document markup modification across computing devices of varying types, by translating a markup object representative of the markup modification to a cross-compatible markup object consumable by various device and application types. The disclosed embodiment may thus enable users of various computing devices to collaboratively modify document markups, and to view the modified document markups in their respective computing devices in real-time. Briefly, in one embodiment, a first client may subscribe to one or more events occurring in a first document markup application, receive a notification indicating a modification to a document markup in the document markup application, extract a markup object associated with the modified document markup, translate the markup object to a cross-compatible markup object, and transmit the cross-compatible markup object to a second client.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 shows an exemplary system infrastructure of communicatively coupled thick client(s), markup server(s), and thin client(s). In general, FIG. 1 depicts thick client(s) 100, markup server(s) 200, and thin client(s) 300.

Figure 10:
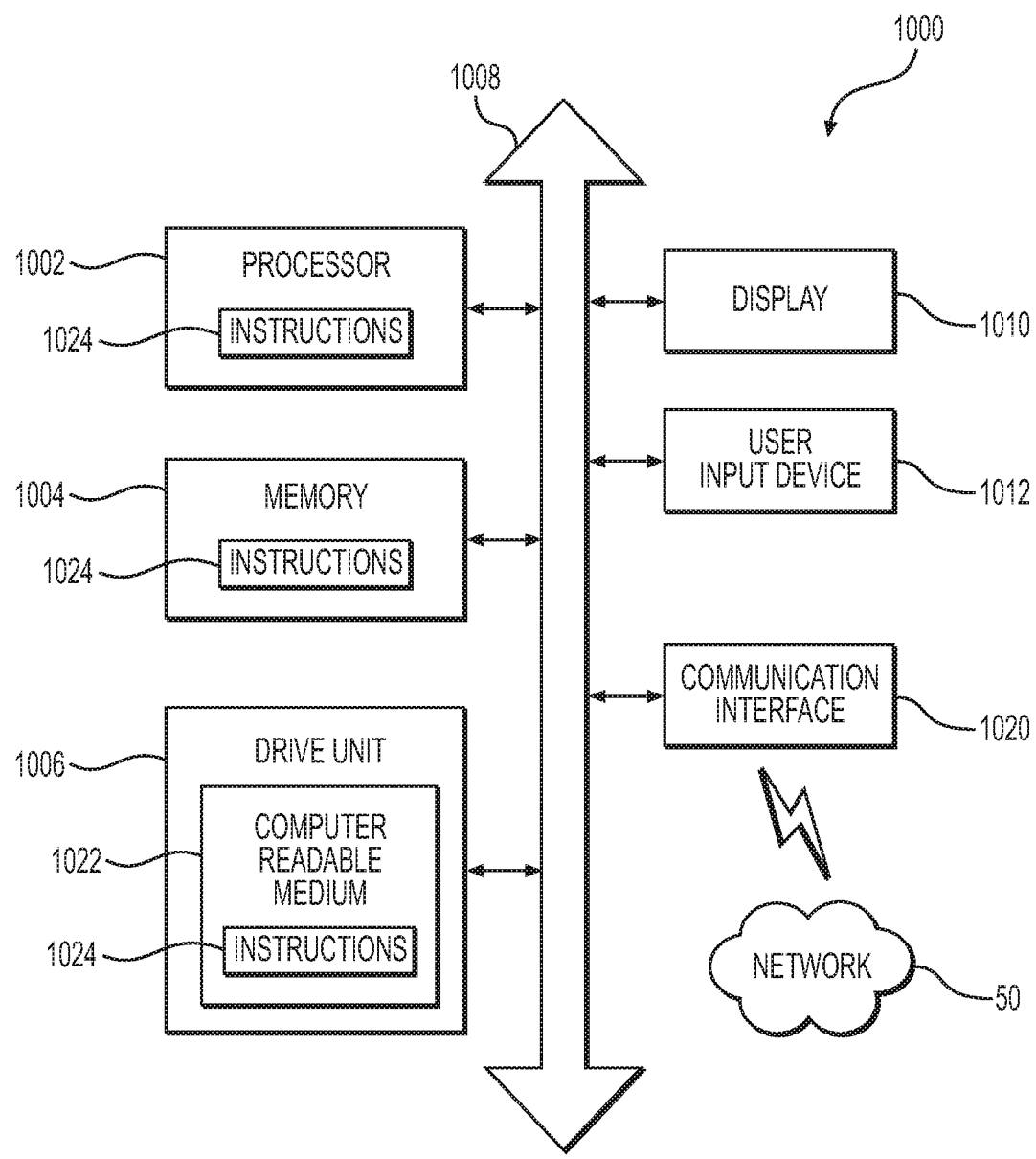
FIG. 10 illustrates an implementation of a general computer system that may execute techniques presented herein.

Thick client 100 may be implemented in a computing system consistent with or similar to that depicted in FIG. 10. Notably, the computing system in which the thick client 100 is implemented may provide rich functionality independent of a connected server. For example, thick client 100 may be implemented in a full-featured computer including a local, nonvolatile data storage (e.g., hard drive). In one embodiment, thick client 100 may be a computer with a software application installed thereon to enable document markup modification of the present disclosure (e.g., thick client application 110 in FIG. 2). Thick client 100 may be connected to a network 50, which may be the Internet, via a wired or wireless connection, and may be in communication with markup server 200 via the network 50. Thin client 300 may also be implemented in a computing system consistent with or similar to that depicted in FIG. 10. However, in contrast to thick client 100, thin client 300 may be implemented in a lightweight computer optimized for establishing a network connection with a server-based computing environment, and may rely heavily or partially on network servers to fulfill a significant part of resource requirement. For example, the computing system in which the thin client 300 is implemented may be a desktop terminal that has no local, nonvolatile data storage (e.g., hard drive). Server(s) connected with the thin client 300 may perform various functions, e.g., executing software applications, running logic, storing data, etc., and take on the processing load of the thin client 300. In one embodiment, thin client 300 may be a computer configured to execute a web browser but might not require a separate installation of a software application for document markup modification of the present disclosure. Thin client 300 may be connected to a network 50 via a wired or wireless connection, and may be in communication with markup server(s) 200 via the network 50. Therefore, thick client(s) 100, markup server(s) 200, and thin client(s) 300 may all be connected to a network 50, and may be in communication with one another via the network 50. Data communication between thick client(s) 100, markup server(s) 200, and thin client(s) 300 (e.g., transmission of markup objects and/or cross-compatible markup objects described below) may be performed utilizing a software library or a communication framework that may allow client-to-server (and vice versa) communications, and/or may allow remote procedure calls, such as, e.g., SignalR.

Network connections may be Internet Protocol Suite-compliant with a Transmission Control Protocol (TCP) component as well as a User Datagram Protocol (UDP) component. Depending on the needs of the services involved, the more reliable and ordered (albeit slower) delivery of data possible through a TCP connection may be more appropriate, or the faster but more unreliable delivery of data through a UDP connection may be more appropriate. Although any network modality may be utilized to transfer data among thick client(s) 100, markup server(s) 200, and thin client(s) 300, it will be appreciated that certain improvements may be realized if the protocol selection is tailored to the particular needs. Where an embodiment contemplates such a selection, those will be particularly noted. Along these lines, the specific network topology is presented by way of example only, however, and any other type of arrangement may be substituted.

Figure 2:
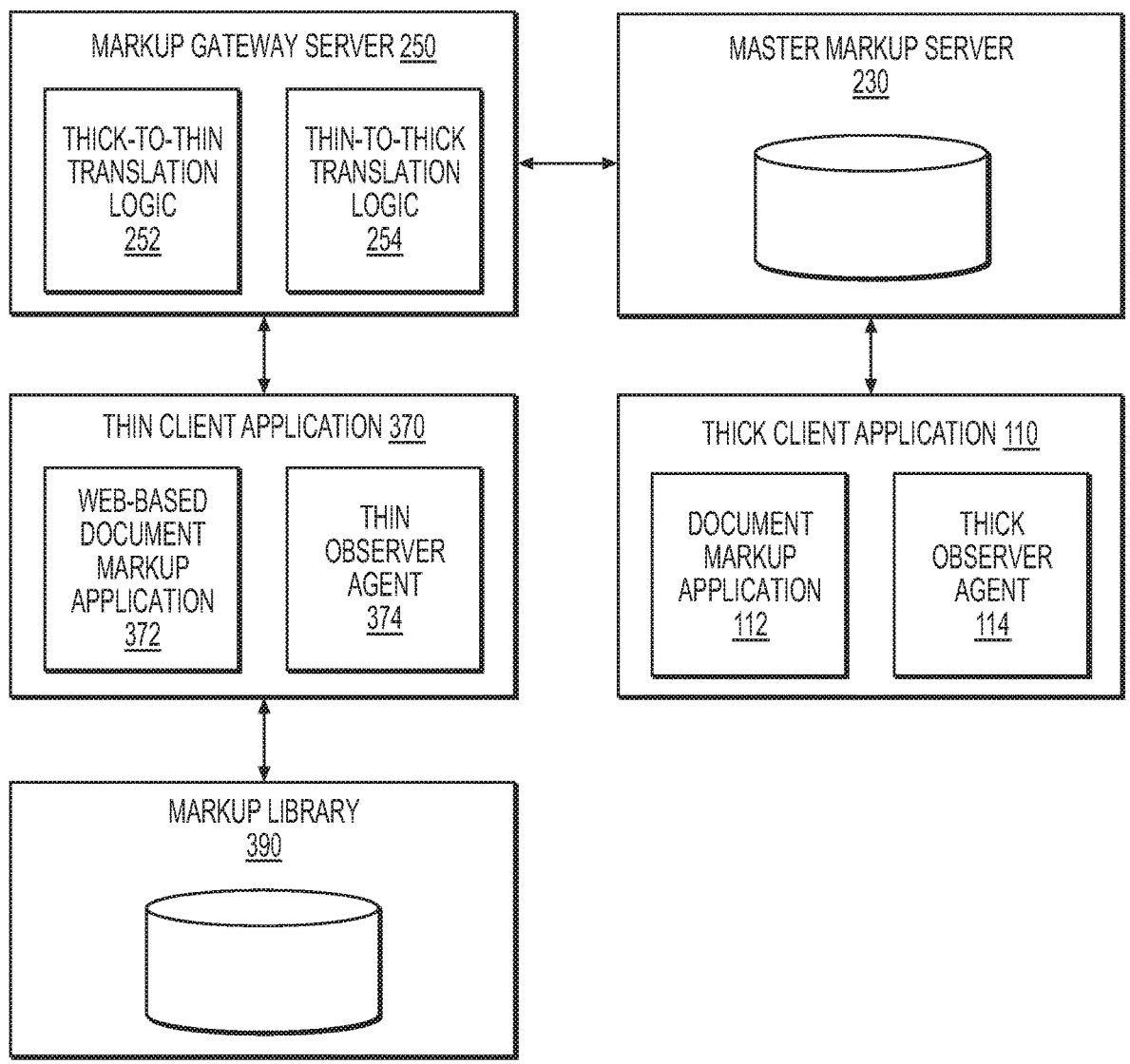
FIG. 2 depicts an exemplary embodiment of a document markup synchronization system, according to one aspect of the present disclosure.

FIG. 2 shows an exemplary embodiment of a document markup synchronization system, according to one aspect of the present disclosure. In general, FIG. 2 depicts a thick client application 110, a master markup server 230, a markup gateway server 250, a thin client application 370, and a markup library 390. In one embodiment, thick client application 110 may be an instance of thick client(s) 100, master markup server 230 and markup gateway server 250 may be instances of markup server(s) 200, and thin client application 370 may be an instance of thin client(s) 300.

Thick client application 110 may be a software application installed and executed on a thick client 100 discussed above in reference to FIG. 1. Accordingly, most or the majority of the processing required by the thick client application 10 may be performed at the client side (i.e., thick client 100) and may involve only aperiodic connection to a server computing environment (e.g., for archival or data communication purposes). For example, the thick client application 110 may run on a windowing system, and accordingly has a number of interface elements that are common to such applications. Each of thick clients 100 may have a copy of the thick client application 110 installed thereon. The copies of the thick client application 110 need not be identical, however, and some thick clients 100 may have a copy with a differing set of functionalities than another such as with trial versions, reader-only versions, and so forth. In some embodiments, some of the processing required by the thick client application 100 may be performed at the server side.

Thick client application 110 may comprise a document markup application 112 and a thick observer agent 114. As will be discussed in greater detail below, the document markup application 112 may be a document reviewing/editing software application which enables a user to locate a document from a local or remote storage, open and make modifications to the document (e.g., add, remove, or modify drawings, annotations, markups, etc.), save the modified document in a local or remote storage, delete the document, collaborate with other users (i.e., users on remote devices, e.g., thick client(s) 100 and thin client(s) 300) synchronously or asynchronously to review/edit the document, etc. In one embodiment, the document markup application 112 may be a PDF document reviewing/editing software application. However, in other embodiments, the document markup application 112 may be a document reviewing/editing software application also compatible with other types of documents such as, e.g., word processing document, CAD drawings, etc. Thick observer agent 114 may be a software module that subscribes to events occurring in the document markup application 112, and is notified of the events as they occur, or pulls the document markup application 112 for any updates. The types of events that occur in the document markup application 112 and get reported to the thick observer agent 114 may include, but might not be limited to, an addition, modification, deletion, and/or movement of a markup in the document markup application 112. In response to receiving a notification indicating an event associated with a markup, thick observer agent 114 may extract a markup object associated with the markup and transmit the markup object to a markup server 200. The transmission of the markup object following the event associated with the markup may be performed using, for example, TCP/IP protocol, in order to "push" the markup object to the markup server 200 as it becomes available.

Master markup server 230 may be part of the server-computing environment, i.e., markup server(s) 200, discussed above in reference to FIG. 1. For example, master markup server 230 may be one of the markup servers 200, or may comprise multiple markup servers 200 together configured to perform functions of the master markup server 230. Master markup server 230 may be in communication with the various components depicted in FIG. 2 (i.e., thick client application 110, markup gateway server 250, thin client application 370) via a network 50. Master markup server 230 may receive markup objects from the thick client application 110 (or the thick observer agent 114 thereof) and store the markup objects in a master database. Further, master markup server 230 may transmit the markup objects to another markup server(s) 200. For example, master markup server 230 may transmit the markup objects to markup gateway server 250 for further processing. The transmission of the markup objects from the master markup server 230 to the markup gateway server 250 may be performed using, for example, TCP/IP protocol, in order to "push" the markup objects to the markup gateway server 250 as they become available. As will be discussed in greater detail below, master markup server 230 may also receive markup objects from markup gateway server 250 after the markup objects have been translated from cross-compatible markup objects, and may transmit the received markup objects to the thick client application 110 using, for example, TCP/IP protocol.

Markup gateway server 250 may also be part of the server-computing environment, i.e., markup server(s) 200, discussed above in reference to FIG. 1. For example, markup gateway server 250 may be one of the markup servers 200, or may comprise multiple markup servers 200 together configured to perform functions of the markup gateway server 250. Notably, markup gateway server 250 may comprise a thick-to-thin translation logic 252 and a thin-to-thick translation logic 254. Markup gateway server 250 may receive a markup object from the thick client application 110 (or the thick observer agent 114 thereof) directly or indirectly via the master markup server 230, and may use the thick-to-thin translation logic 252 to translate the markup object to a cross-compatible markup object, which may be transmitted to thin client application 370 (e.g. in real-time using WebSocket) for further use. As will be further elaborated below, markup gateway server 250 may also receive cross-compatible markup objects from the thin client application 370 (and/or the thin observer agent 374 thereof), and may use the thin-to-thick translation logic 254 to translate the cross-compatible markup object to a markup object. The markup object may then be transmitted to the master markup server 230 (or directly to the thick client application 110) using, for example, TCP/IP protocol, in order to "push" the markup object to the master markup server 230 (or directly to the thick client application 110) as it becomes available.

Thin client application 370 may be implemented on a thin client 300 discussed above in reference to FIG. 1. In one embodiment, thin client application 370 may comprise a web-based document markup application 372 and a thin observer agent 374. As will be discussed in greater detail below, the web-based document markup application 372 may be a web-based document reviewing/editing software application which enables a user to locate a document from a remote storage, open and make modifications to the document (e.g., add, remove, or modify drawings, annotations, markups, etc.), save the modified document in a remote storage, delete the document, collaborate with other users (i.e., users on remote devices, e.g., thin client(s) 300 and thick client(s) 200) synchronously or asynchronously to review/edit the document, etc. In one embodiment, the web-based document markup application 372 may be a PDF document reviewing/editing software application. However, in other embodiments, the web-based document markup application 372 may be a document reviewing/editing software application also compatible with other types of documents such as, e.g., word processing document, CAD drawings, etc. The web-based document markup application 372 may be provided as software as a service (SaaS). Thin observer agent 374 may be a software module that subscribes to events occurring in the web-based document markup application 372, and may be notified of the events as they occur. The types of events that occur in the web-based document markup application 372 and get reported to the thin observer agent 374 may include, but might not be limited to, an addition, modification, deletion, and/or movement of a markup in the web-based document markup application 372. In response to receiving a notification indicating an event associated with a markup, thin observer agent 374 may extract a cross-compatible markup object associated with the markup and transmit the cross-compatible markup object to a markup server 200. In one embodiment, thin observer agent 374 may transmit the cross-compatible markup object to the markup gateway server 250, to translate the cross-compatible markup object to a markup object for use with the thick client application 110 (i.e., document markup application 112).

As alluded to above, thin client application 370 may be an application that is implemented on a thin client 300, and may comprise a web-based document markup application 372. For example, thin client application 370 may be a web browser installed on a thin client 300, which provides a platform for the web-based document markup application 372 to run. Although FIG. 2 shows the web-based document markup application 372 and the thin observer agent 374 enclosed within the thin client application 370, most of the application logic and data storage for the web-based document markup application 372 may be housed and carried out in a server-computing environment, i.e., markup server(s) 200, discussed above in reference to FIG. 1, and the web-based document markup application 372 may be accessed and provided on the thin client 300 by using a web browser. For example, thin client application 370 may be a web browser (e.g., JavaScript-enabled web browser) configured to display document markup modifications using cross-compatible markup objects received from markup gateway server 250. As alluded to above, the actual application logic enabling the functionalities of the web-based document application 372 and the thin observer agent 374 may be at least partially stored and performed at a back-end system, such as the markup gateway server 250. Accordingly, in one embodiment, thin client application 370 may be an application installed on a thin client 300, such as a web browser, configured to interpret the cross-compatible, and/or browser-friendly, markup objects received from the markup gateway server 250 and to run the web-based document markup application 372 within the browser. Because at least some of the processing takes place at the back-end server(s), the web-based document markup application 372 may also be referred to as a server-based document markup application in the present disclosure. In some embodiments, the server-based document markup application may be accessed using means different from a web-browser. For example, the server-based document markup application may also be accessed and provided on various types of devices, including but not limited to, mobile phones, tablets, gaming devices, Internet-of-Things (IoT) devices, etc., using an application built on a common application platform such as, e.g., Universal Windows Platform (UWP).

Markup library 390 may be a shared markup rendering library coupled to the thin client application 370, such that the web-based document markup application 372 may render and display the cross-compatible markup objects across various types of devices using the bindings stored in the markup library 390. More specifically, markup library 390 may comprise a cross platform software developer's kit (SDK) for rendering and mutating markups in the web-based (i.e., server-based) document markup application 372 accessed by a variety of devices. For example, markup library 390 may be a cross-platform markup rendering library written in the Rust programming language, with bindings for HTML5 Canvas using WebAssembly and/or iOS.

It should be noted that, although thick client application 110, master markup server 230, markup gateway server 250, thin client application 370, and markup library 390 are shown as separate entities in FIG. 2, all or a portion of these components (and the steps performed thereof) may be implemented in a single computing device consistent with or similar to that depicted in FIG. 10. For example, in one embodiment, master markup server 230 and markup gateway server 260 may be implemented on a single computing device. In another embodiment, master markup server 230, markup gateway server 250, and thin client application 370 may be implemented on a single computing device. In yet another embodiment, thick client application 110, master markup server 230, and markup gateway server 250 may be implemented on a single computing device. In yet another embodiment, thick client application 110, master markup server 230, markup gateway server 250, thin client application 370, and markup library 390 may indeed be implemented separately on their respective computing devices. In yet another embodiment, all or portions of the application logic(s) and the components enabling the functionalities of the master markup server 230 and the markup gateway server 250 (e.g., translation, storage, and transmission of the or cross-compatible markup objects) may be implemented in either one of or both the thick client application 110 and the thin client application 370, so that the thick client application 110 and the thin client application 370 may directly transmit markup objects with each other. For example, thick client application 110 may comprise thick-to-thin translation logic 252 to translate markup objects to cross-compatible markup objects, and to transmit the cross-compatible markup objects directly to thin client application 370. Similarly, thin client application 370 may comprise thin-to-thick translation logic 254 to translate cross-compatible markup objects to markup objects, and to transmit the markup objects directly to thick client application 110. In another example, thick client application 110 may comprise both the thick-to-thin translation logic 252 and the thin-to-thick translation logic 254, to translate markup objects to cross-compatible markup objects, to transmit the cross-compatible objects directly to thin client application 370, and to translate cross-compatible objects received directly from thin client application 370 to markup objects. Similarly, thin client application 370 may comprise both the thick-to-thin translation logic 252 and the thin-to-thick translation logic 254. The configurations specifically discussed herein regarding the arrangement of the components depicted in FIG. 2 are merely exemplary, and it would be obvious to a person of ordinary skill in the relevant art that different combinations of components may be implemented on a single or multiple computing devices.

With continuing reference to FIG. 2, the document markup application 112 and the web-based document markup application 372 may enable a user of a thick client 100 and another user at a thin client 300 to collaborate in a real-time document markup modification session. For example, the user of the thick client application 110 may invite the user of the thin client application 370 to a document markup modification session, using the document markup application 112. The invitation may be sent by an email, a text message, a chat message, etc. The user of the thin client application 370 may join the document markup modification session by accepting the invitation, for example, by clicking a link in the invitation or by starting the web-based document markup application 372 and inputting a session identifier and/or a password provided in the invitation. Any now known or later developed forms of invitation and authorization process may be used to invite and authorize access to a document markup modification session. Further, the user of the thick client application 110 may set permissions, so that the user of the thin client application 372 may have limited or full access/privileges to document markups and/or modifications thereof. For example, the permissions may specify whether the invited user is authorized to view, add, modify, delete, upload, and/or download certain markups. Once users of the thick client application 110 and the thin client application 370 are in-session, the users may collaboratively view, add, modify, and/or delete the document markups (any of these actions will be referred to as a "markup modification" throughout this disclosure) within their respective applications (i.e., document markup application 112 and web-based document markup application 372). The markup modification by a user may be monitored and reported to markup server(s) 200 by an observer agent (i.e., thick observer agent 114 or thin observer agent 374), and may further be processed by the markup server(s) 200 and propagated to the document markup application of the other user in a format consumable by the receiving document markup application. The process of propagating the markup modification may be completed synchronously or substantially synchronously, so that the user of the receiving document markup application may see the changed markup in real-time.

More particularly, the markup modification may initially be represented by either: a markup object if the markup is modified in a document markup application 112, or a cross-compatible markup object, for example, a browser-friendly markup object, if the markup is modified in a web-based markup application 372. Depending on the type of the recipient application (i.e., thick client application 110 or thin client application 370), the initial representation of the markup modification may be translated to a target representation or may be sustained. For example, if the markup modification is made by a user of a thick client application 110 during a markup modification session and another user of a thin client application 370 is a participant in the markup modification session, the representation of the markup modification, i.e., a markup object, may be extracted and transmitted to markup server(s) 200, translated to a target representation, i.e., a cross-compatible markup object, and transmitted to a web-based document markup application 372 of the thin client application 370. Conversely, if the markup modification is made by a user of a thin client application 370 during a markup modification session and another user of a thick client application 110 is a participant in the markup modification session, the representation of the markup modification, i.e., a cross-compatible markup object, may be extracted and transmitted to markup server(s) 200, translated to a target representation, i.e., a markup object, and transmitted to a document markup application 112 of the thick client application 110. In the event that there are users within a markup modification session who are using the same type of client application, translation of the markup object may be unnecessary and the initial representation of the markup modification may be transmitted without being translated.

Figure 3:
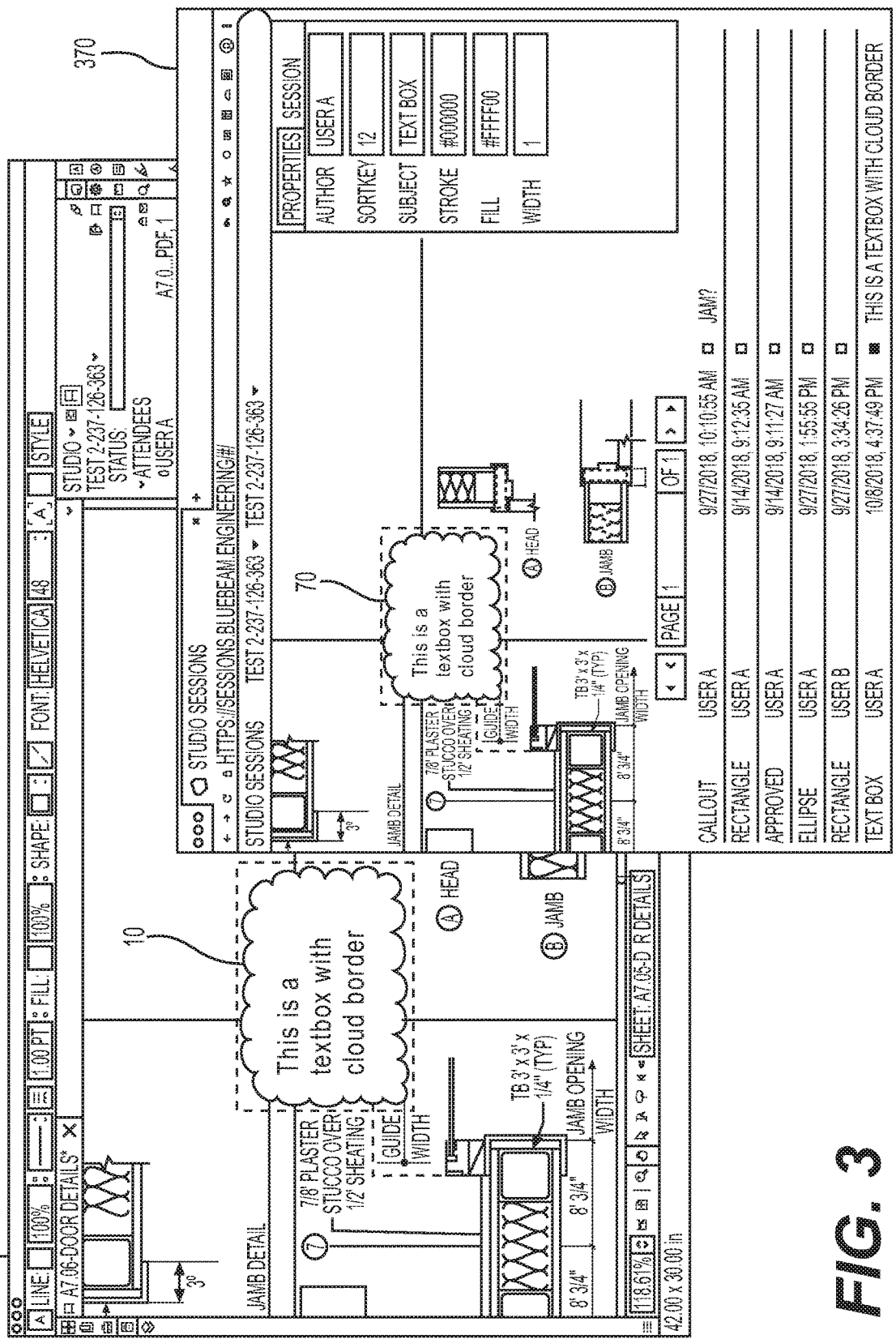
FIG. 3 depicts exemplary graphical user interfaces (GUIs) of a thick client application and a thin client application during a markup modification session, according to one aspect of the present disclosure.

FIG. 3 shows exemplary graphical user interfaces (GUIs) of a thick client application and a thin client application during a markup modification session. In general, FIG. 3 depicts a thick client application 110, a markup 10 applied within the thick client application 110, a thin client application 370, and a markup 70 displayed within the thin client application 370.

A markup modification session may be generally understood to be an interactive exchange of markups or modifications thereof among thick and thin clients 300 and 100, respectively, which are participants in that markup modification session. The markup modification session may be defined by one or more markups that are reviewed and/or manipulated, and by the participants involved. Additionally, each markup modification session may have associated therewith permissions as to which participants can join that markup modification session, and the identity of the participant initiating that markup modification session. In one embodiment, the participants can join simultaneously, or in a synchronous markup modification session, to work on the markups in real-time. In other embodiments, the markup modification session may be asynchronous because it may not be necessary for each of the participants to join at the same time to work on the markups, and for providing an offline mode in case of intermittent network connectivity, where a participant may still work on the markups without being connected to the network. Under such a circumstance, the modifications made while offline may be uploaded once the network connectivity is restored. Various embodiments of the present disclosure contemplate features that enable such synchronous/asynchronous markup modification sessions.

For example, in a synchronous markup modification session, when a markup 10 is modified by a user of the thick client application 110, the markup modification may be propagated to the thin client application 370 in real-time and the modified markup is displayed as the markup 70 within the thin client application 370. Conversely, when the markup 70 is modified by the user of the thin client application 370, the markup modification may be propagated to the thick client application 110 in real-time and the modified markup is displayed as the markup 10 within the thick client application 110. Notably, attributes of the markup 70 (e.g., location, size, color, rotation, markup type, text, etc.) may be identical to those of the markup 10. The modification may include, but might not be limited to, addition, deletion, movement, replacement (with a different markup), resizing, change of orientation/rotation, text addition/modification, color modification, or any other modification that may be represented at least in part by the markup object and the cross-compatible markup object.

Various functions performed by the components depicted in FIG. 2 will now be described. It should be appreciated that the described methods are merely exemplary. In some embodiments, the methods may include a number of additional or alternative steps, and in some embodiments, one or more of the described steps may be omitted. Any described step may be omitted or modified, or other steps added, as long as the intended functionality of the document markup synchronization system remains substantially unaltered. Further, although a certain order is described or implied in the described methods, in general, the steps of the described methods need not be performed in the illustrated and described order. Further, the described methods may be incorporated into a more comprehensive procedure or process having additional functionality not described herein.

Figure 4:
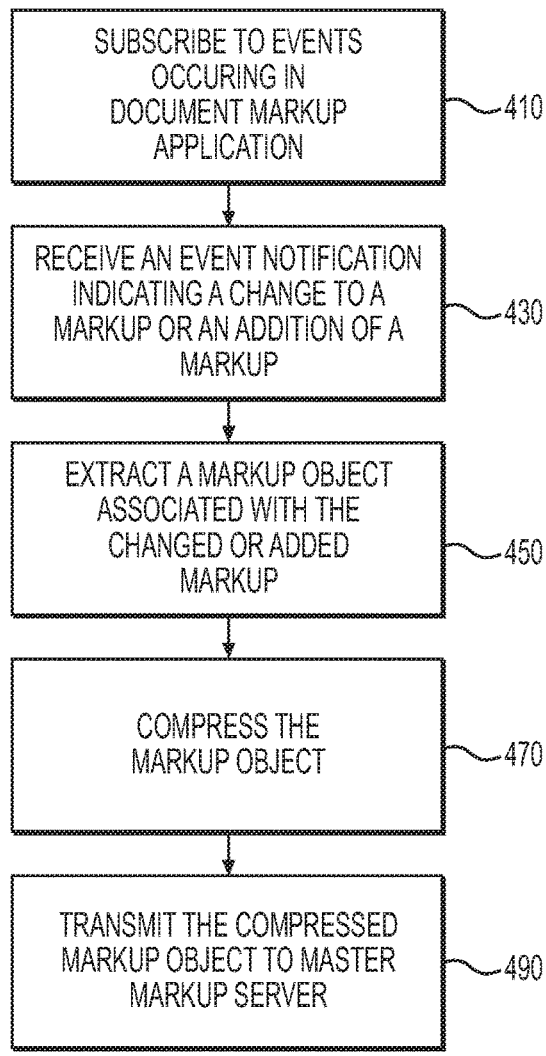
FIG. 4 is a flowchart illustrating an exemplary method of extracting and transmitting a markup object, according to one aspect of the present disclosure.

FIG. 4 is a flowchart illustrating an exemplary method of extracting and transmitting a markup object, according to one aspect of the present disclosure. In one embodiment, the exemplary method of FIG. 4 may be performed by a thick observer agent 114 at the thick client side. First, at step 410, the thick observer agent 114 may subscribe to events occurring in the document markup application 112. The events may comprise markup modification events. At step 430, in response to an event occurring in the document markup application 112, the thick observer agent 114 may receive an event notification indicating a change to a markup or an addition of a markup (i.e., indicating a markup modification). At step 450, in response to receiving the notification, the thick observer agent 114 may extract a markup object associated with the changed or added markup. Notably, the thick observer agent 114 may have access to in-memory markup representation (e.g., in-memory PDF representation) where the markup objects may be in decoded states. In response to being notified of the markup modification event, the thick observer agent 114 may access the in-memory markup representation, and extract the markup object associated with the modified markup, the markup object being a markup dictionary associated with the modified markup (e.g., PDF dictionary object containing key-value paired data that describes the modified markup). At step 470, the thick observer agent 114 may compress the markup object. Then, at step 490, the thick observer agent 114 may transmit the compressed markup object to a master markup server 230 (e.g., using TCP/IP protocol). In some embodiments, the markup object may not be compressed. In some embodiments, the markup object may be transmitted directly to a markup gateway server 250 (e.g., using TCP/IP protocol), bypassing the master markup server 230. In some embodiments, as alluded to above in reference to FIG. 2, the master markup server 230 and the markup gateway server 250 may be implemented in a single computing device (i.e., a single server). Therefore, any subsequent transmission of the markup object between the master markup server 230 and the makeup gateway server 250 may actually be a transmission between components of a single computing device.

Figure 5:
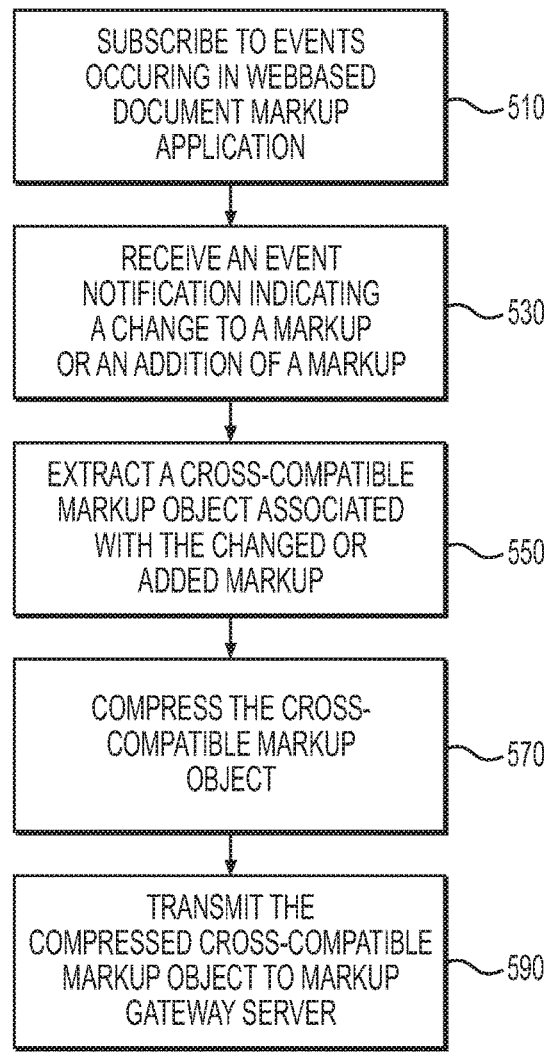
FIG. 5 is a flowchart illustrating an exemplary method of extracting and transmitting a cross-compatible markup object, according to one aspect of the present disclosure.

FIG. 5 is a flowchart illustrating an exemplary method of extracting and transmitting a cross-compatible markup object, according to one aspect of the present disclosure. In one embodiment, the exemplary method of FIG. 5 may be performed by a thin observer agent 374 at the thin client side. First, at step 510, the thin observer agent 374 may subscribe to events occurring in the web-based document markup application 372. The events may comprise markup modification events. At step 530, in response to an event occurring in the web-based document markup application 372, the thin observer agent 374 may receive an event notification indicating a change to a markup or an addition of a markup (i.e., indicating a markup modification). At step 550, in response to receiving the notification, the thick observer agent 374 may extract a markup object associated with the changed or added markup. In some embodiments, the thin observer agent 374 may have access to in-memory markup representation (e.g., in-memory JavaScript Object Notation (JSON) representation). In response to being notified of the markup modification event, the thin observer agent 374 may access the in-memory markup representation, and extract the cross-compatible markup object associated with the modified markup. In one embodiment, the cross-compatible markup may be a JSON object representing the modified markup. At step 570, the thin observer agent 374 may compress the cross-compatible markup object, and at step 590, may transmit the compressed cross-compatible markup object to a markup gateway server 250. In some embodiments, the cross-compatible markup object may not be compressed prior to being transmitted. In some embodiments, data transmission between the thin observer agent 374 and the markup gateway server 250 may take place over a network 50. However, in other embodiments, as discussed above in reference to FIG. 2, data transmission between the thin observer agent 374 and the markup gateway server 250 may be between components of a single computing device. Further, in some embodiments, the markup gateway server 250 and the master markup server 230 may also be implemented in a single computing device (i.e., a single server). Therefore, any subsequent transmission of the cross-compatible markup object between the markup gateway server 250 and the master markup server 230 may actually be a transmission between components of a single computing device.

Figures 6A, 6B:
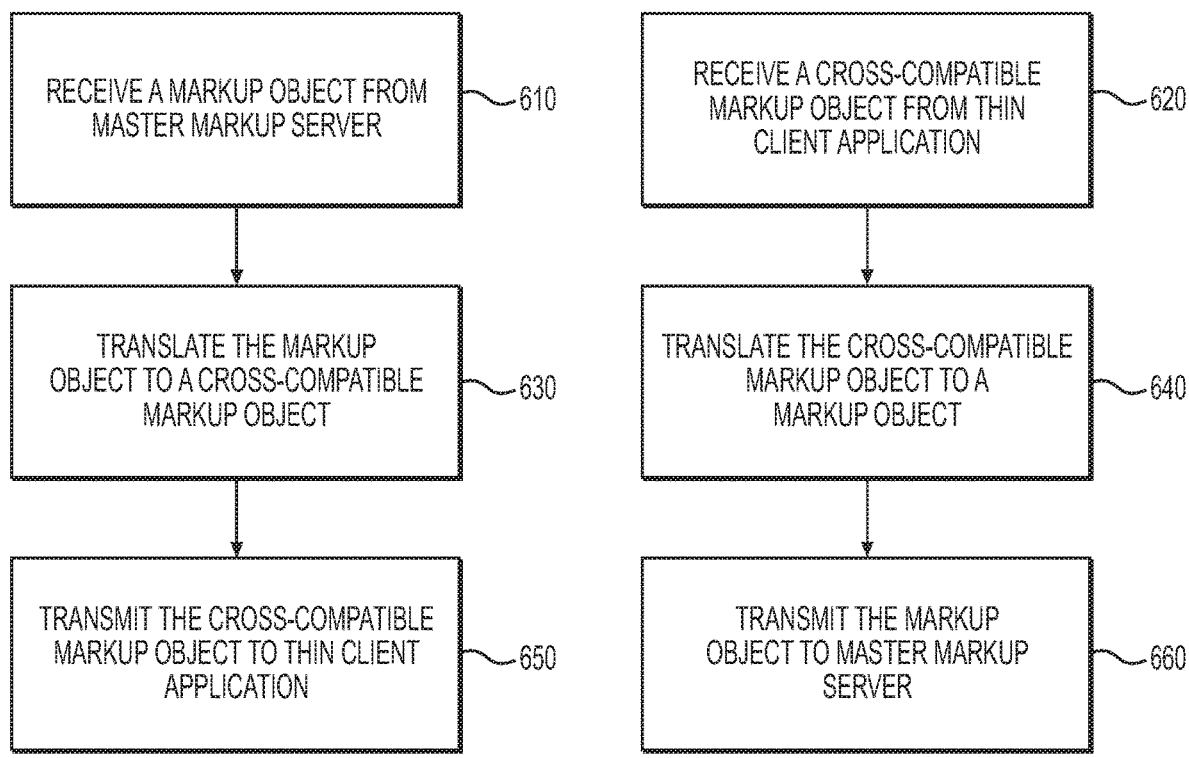
FIG. 6A is a flowchart illustrating an exemplary method of translating a markup object to a cross-compatible markup object, according to one aspect of the present disclosure.
FIG. 6B is a flowchart illustrating an exemplary method of translating a cross-compatible markup object to a markup object, according to one aspect of the present disclosure.

FIGS. 6A-6B are flowcharts illustrating exemplary methods of translating a markup object. In particular, FIG. 6A illustrates an exemplary method of translating a markup object to a cross-compatible markup object, which may be performed by markup server(s) 200. FIG. 6B illustrate an exemplary method of translating a cross-compatible markup object to a markup object, which may also be performed by markup server(s) 200. Particularly, in one embodiment, the exemplary methods shown in FIGS. 6A-6B may be performed by the markup gateway server 250. FIG. 7 illustrates an exemplary markup object and a corresponding exemplary cross-compatible markup object. In the discussion below, reference will be made to FIGS. 6A, 6B and 7.

In FIG. 6A, at step 610, the markup gateway server 250 may receive a markup object from a master markup server 230 (as described above with reference to FIG. 4). In some embodiments, the markup gateway server 250 may receive the markup object directly from the thick client application 110, bypassing the master markup server 230. In the event that the markup object has been compressed by the sending component (i.e., master markup server 230 or thick client application 110), the received markup may be decompressed by the markup gateway server 250. At step 630, the markup gateway server 250 may translate the markup object to a cross-compatible markup object for use with a thin client application 370. At step 650, the markup gateway server 250 may transmit the cross-compatible markup object to the thin client application 370 using, for example, WebSocket. In some embodiments, the cross-compatible markup object may be compressed prior to being transmitted. In one embodiment, the markup object may be a PDF dictionary object describing the markup modified by the user of the document markup application 112, and the cross-compatible markup object may be a browser-friendly markup object corresponding to the PDF dictionary object describing the modified markup such as, for example, a JSON object translated from the markup object. Therefore, the format associated with the cross-compatible markup object may be more browser/web-compatible (i.e., substantially less processing intensive in a browser/web environment) than the PDF dictionary markup object. In FIG. 7, the exemplary markup object 10A (i.e., a PDF dictionary object representing a "circle" markup in PDF) and the corresponding exemplary cross-compatible markup object 70A (i.e., JSON object) are shown side-by-side.

PDF lacks a consistent string encoding mechanism such as UTF-8. As known to a person of ordinary skill in the relevant art, UTF-8 is a variable width character encoding capable of encoding all 1,112,064 valid code points in Unicode using one to four 8-bit bytes, designed for backward compatibility with American Standard Code for Information Interchange (ASCII). PDF has a myriad of string encodings, and to properly account for all variations and full Unicode support requires significant PDF expertise. In contrast, the JSON object simply uses UTF-8, which is a format that is much more consumable by various device types of varying characteristics and processing capacities.

To illustrate the complexity involved with processing a PDF dictionary object, the following example is provided. "Blüe" is encoded in a PDF string as (BI\374e). The \374 character is an octally encoded index into the "PDF Encoding" which is a character set specific to PDF. From there the glyph name "udieresis" can be determined from a lookup table. The actual Unicode code points can then be determined and then finally the string can be encoded as UTF-8. It would be undesirable to duplicate this type of logic at thin client(s) 300.

Another complexity to PDF dictionary objects is that for certain markup types, the PDF Dictionary objects reference other external PDF Dictionary objects that are "Resources." For instance, markup representations for stamps and images, and for markups that contain hatch patterns and/or are measurement-based, all have such resources. With a translation for thin client applications, all of these resource types need to be accounted for. For example, image markups may need to have the image extracted. For stamps (of which the appearance may be arbitrary PDF content), a set of resources may need to be repackaged into a standalone PDF file, and a rasterized version of that PDF may also need to be saved. PDF supports a vast number of image types and some at this point are only supported within PDF (e.g., JBIG2 and Jpeg2000 in particular) which accounts for some of the complexity. Accordingly, part of the translation to cross-compatible markup objects may be to re-encode these images into a more simple image format such as, e.g., Jpeg or PNG.

In FIG. 6B, at step 620, the markup gateway server 250 may receive a cross-compatible markup object from a thin client application 370 (as described above with reference to FIG. 5). In the event that the cross-compatible markup object has been compressed by the thin client application 370, the received cross-compatible markup may be decompressed by the markup gateway server 250. At step 640, the markup gateway server 250 may translate the cross-compatible markup object to a markup object for use with a thick client application 110. In one embodiment, the cross-compatible markup object may be a browser-friendly markup object describing the markup modified by the user of the web-based document markup application 372 such as, for example, a JSON object, and the markup object may be a PDF dictionary object corresponding to the cross-compatible markup object describing the modified markup (i.e., a PDF dictionary object translated from the JSON object describing the modified markup). Then, at step 660, the markup gateway server 250 may transmit the markup object to a master markup server 230 using, for example, TCP/IP protocol. In some embodiments, the markup object may be compressed prior to being transmitted.

Figure 8:
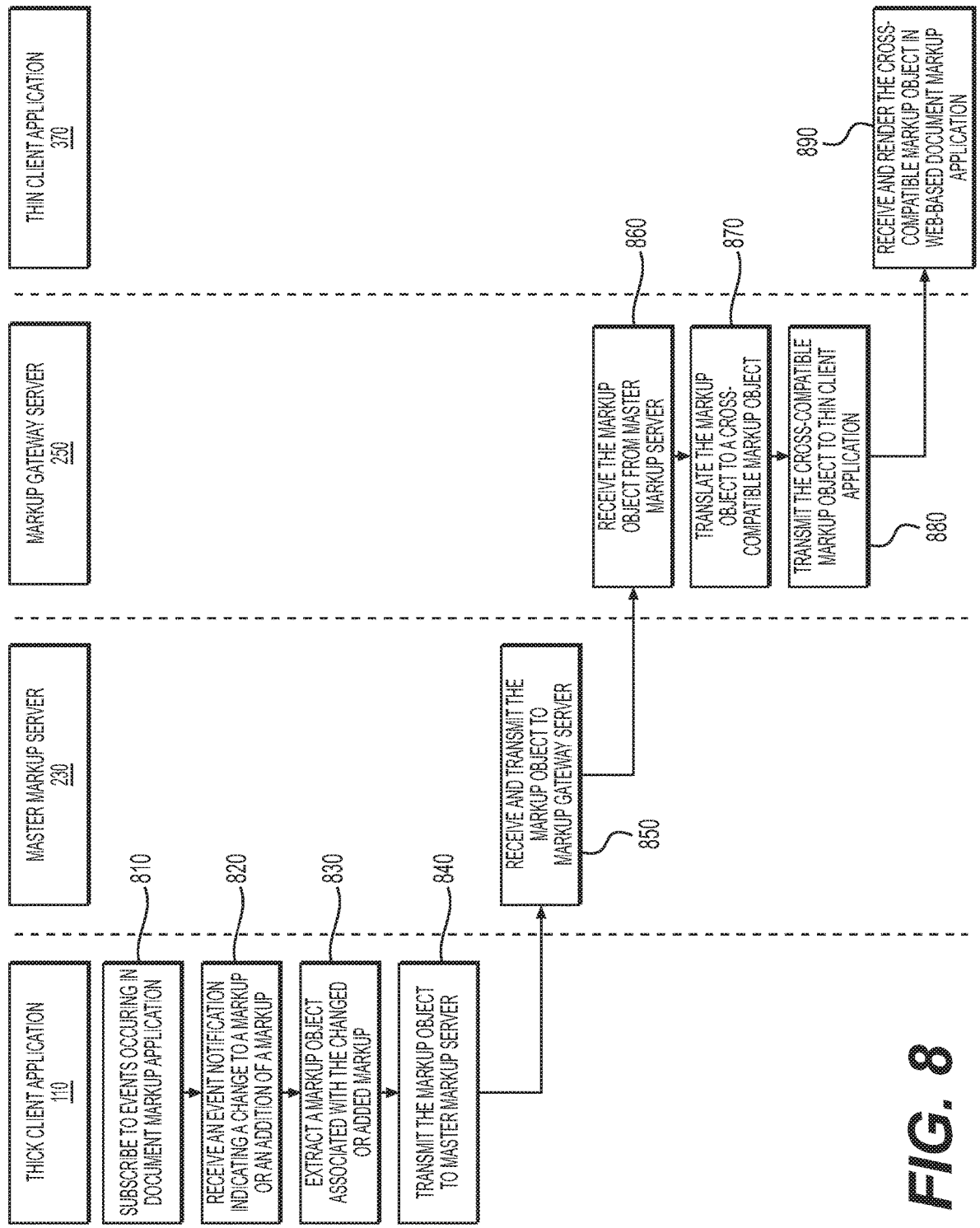
FIG. 8 depicts a system flowchart illustrating an exemplary method of synchronizing a document markup modification across a plurality of devices, according to one aspect of the present disclosure.

FIG. 8 is a system flowchart illustrating an exemplary method of synchronizing a document markup modification across a plurality of devices. In particular, FIG. 8 illustrates a method of propagating a document markup modification made using a thick client application 110 (or the document markup application 112 thereof), to a thin client application 370 (or the web-based document markup application 372 thereof).

At step 810, thick observer agent 114 may subscribe to events occurring in the document markup application 112. The events may comprise markup modification events. At step 820, in response to an event occurring in the document markup application 112, the thick observer agent 114 may receive an event notification indicating a change to a markup or an addition of a markup (i.e., indicating a markup modification). At step 830, in response to receiving the notification, the thick observer agent 114 may extract a markup object associated with the changed or added markup. Then, at step 840, the thick observer agent 114 may transmit the markup object to a master markup server 230.

With continuing reference to FIG. 8, at step 850, the master markup server 230 may receive the markup object from the thin client application 110, and subsequently transmit the markup object to a markup gateway server 250. At step 860, the markup gateway server 250 may receive the markup object from the master markup server 230. At step 870, the markup gateway server 250 may translate the markup object to a cross-compatible markup object. Then, at step 880, the markup gateway server 250 may transmit the cross-compatible markup object to a thin client application 370. At step 890, the thin client application 370 may receive the cross-compatible markup object from the markup gateway server 250 and may render the cross-compatible markup object in the web-based document markup application 372. If the cross-compatible markup object is received in a compressed format, the thin client application 370 may decompress the cross-compatible markup object prior to rendering.

Figure 9:
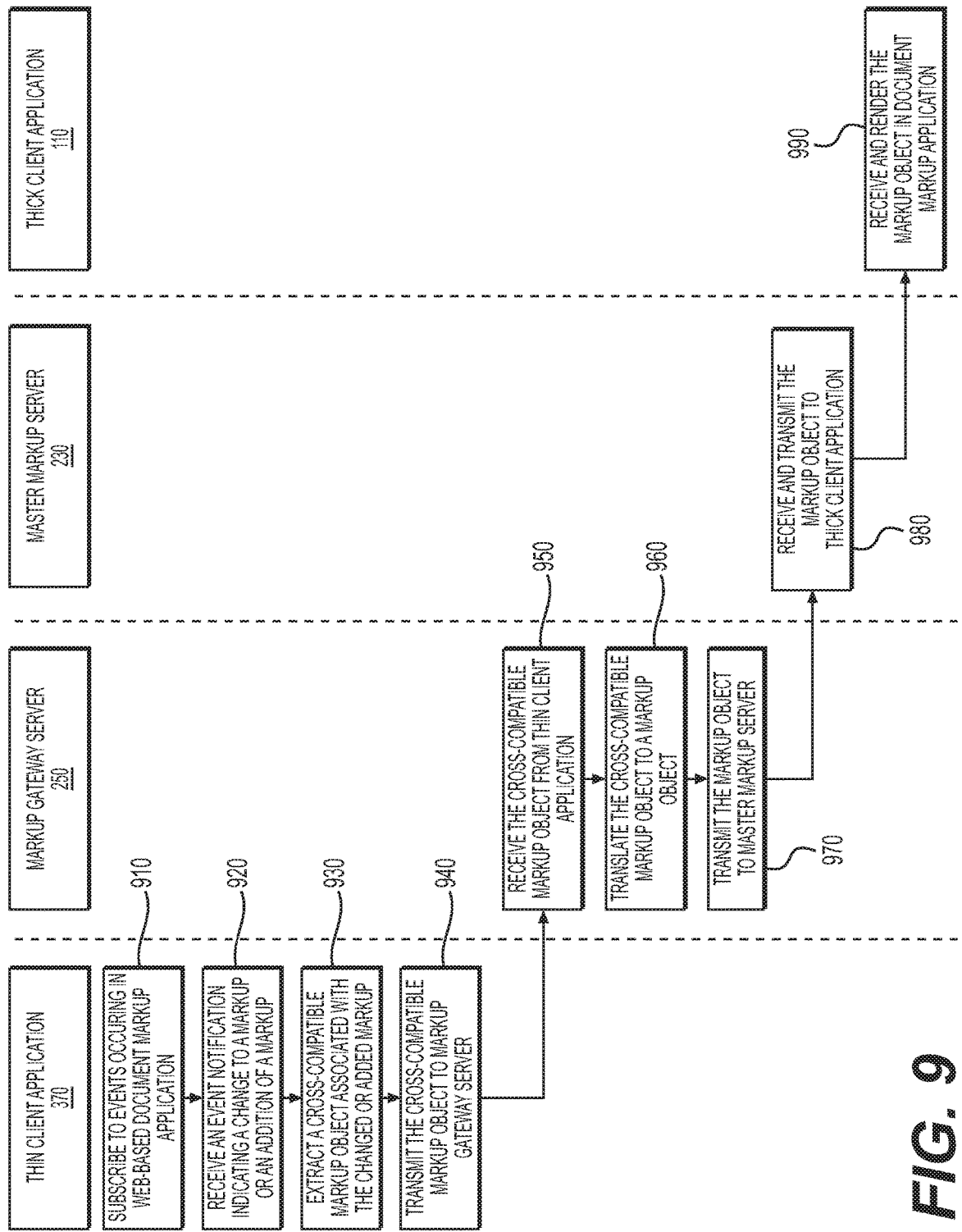
FIG. 9 is a system flowchart illustrating another exemplary method of synchronizing a document markup modification across a plurality of devices, according to one aspect of the present disclosure.

FIG. 9 is a system flowchart illustrating another exemplary method of synchronizing a document markup modification across a plurality of devices. In particular, FIG. 9 illustrates a method of propagating a document markup modification made using a thin client application 370 (or the web-based document markup application 372 thereof), to a thick client application 110 (or the document markup application 112 thereof).

At step 910, thin observer agent 374 may subscribe to events occurring in the web-based document markup application 372. The events may comprise markup modification events. At step 920, in response to an event occurring in the web-based document markup application 372, the thin observer agent 374 may receive an event notification indicating a change to a markup or an addition of a markup (i.e., indicating a markup modification). At step 930, in response to receiving the notification, the thin observer agent 374 may extract a cross-compatible markup object associated with the changed or added markup. Then, at step 940, the thin observer agent 374 may transmit the cross-compatible markup object to a markup gateway server 250.

With continuing reference to FIG. 9, at step 950, the markup gateway server 250 may receive the cross-compatible markup object from the thin client application 370. At step 960, the markup gateway server 250 may translate the cross-compatible markup object to a markup object. Then, at step 970, the markup gateway server 250 may transmit the markup object to a master markup server 230. At step 980, the master markup server 230 may receive the markup object from the markup gateway server 250, and transmit the markup object to a thick client application 110. At step 990, the thick client application 110 receives the markup object from the master markup server 230 and render the markup object in the document markup application 112. If the markup object is received in a compressed format, the thick client application 110 may decompress the markup object prior to rendering.

Embodiments of the present disclosure concerning synchronizing a document markup modification across a plurality of devices addresses the drawbacks of the prior approaches, using some of the techniques discussed above. In general, the embodiments of the present disclosure have at least the following distinguishable features that lead to significant technical improvements:

1) Renders markup objects across various types of devices without duplicating markup interpretation/translation logic on each of those devices, by using bindings stored in a markup library.
2) Open format markups suitable for consumption by a variety of computing platforms (e.g., think/thin clients, third party applications, etc.).
3) Enables markups to flow throughout the document markup modification ecosystem, regardless of the clients or services producing or consuming the markup information.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 10 illustrates an implementation of a general computer system designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1000 may further include a display unit 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input device 1012 configured to allow a user to interact with any of the components of system 1000. The input device 1012 may be a number pad, a keyboard, or a cursor control device, such as a mouse, or a joystick, touch screen display, remote control, or any other device operative to interact with the computer system 1000.

The computer system 1000 may also or alternatively include a disk or optical drive unit 1006. The disk drive unit 1006 may include a computer-readable medium 1022 in which one or more sets of instructions 1024, e.g. software, can be embedded. Further, the instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 50 can communicate voice, video, audio, images, or any other data over the network 50. Further, the instructions 1024 may be transmitted or received over the network 50 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 50, external media, the display 1010, or any other components in system 1000, or combinations thereof. The connection with the network 50 may be a physical connection, such as a wired Ethernet connection or may be established wirelessly as discussed below. Likewise, the additional connections with other components of the system 1000 may be physical connections or may be established wirelessly. The network 50 may alternatively be directly connected to the bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to one or more networks 50. The network 50 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 50 may include wide area networks (WAN), such as the Internet, local area networks (LAN), campus area networks, metropolitan area networks, a direct connection such as through a Universal Serial Bus (USB) port, or any other networks that may allow for data communication. The network 50 may be configured to couple one computing device to another computing device to enable communication of data between the devices. The network 50 may generally be enabled to employ any form of machine-readable media for communicating information from one device to another. The network 50 may include communication methods by which information may travel between computing devices. The network 50 may be divided into sub-networks. The sub-networks may allow access to all of the other components connected thereto or the sub-networks may restrict access between the components. The network 50 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method of synchronizing a document markup modification across a plurality of devices, comprising:
   subscribing to one or more events occurring in a first document markup application;
   receiving a notification indicating a modification to a document markup in the first document markup application, the document markup being a visual element overlaid on an underlying document and the modification being indicative of a change to the visual element, such that a modified document markup is formed by the first document markup application;
   receiving permission settings defined by the first document markup application representative of access limitations to the modified document markup based on an application receiving the modified document markup;
   extracting a first markup object representative of the modified document markup, that is generated and stored by the first document markup application, the first document markup application being one of a thick client application or a thin client application comprising a web-based document markup application;
   translating the first markup object to a second markup object; and
   transmitting the second markup object and the permission settings to a second document markup application, the second document markup application being another of the thick client application or the thin client application comprising the web-based document markup application;
   wherein the second markup object is accessible at the second document markup application in accordance with the permission settings, such that access to the second markup object at the second document markup application is defined by the first document markup application.

2. The method of claim 1, wherein one of the first markup object or the second markup object is determined to be more browser-compatible than another of the first markup object or the second markup object.

3. The method of claim 1, wherein the first markup object is extracted from i) an in-memory portable document format (PDF) representation of the modified document markup or ii) an in-memory JavaScript Object Notation (JSON) representation of the modified document markup.

4. The method of claim 1, wherein prior to translating the first markup object to the second markup object, the method comprises:
   determining a type of the second document markup application being one of the thick client application or the thin client application; and
   translating the first markup object to the second markup object when the first document markup application is the thick client application and the second document markup application is the thin client application comprising the web-based document markup application; or
   forgoing translation of the first markup object to the second markup object when both the first document markup application and the second document markup application are the thick client applications, or both the first document markup application and the second document markup application are the thin client applications.

5. The method of claim 1, wherein the thin client application is coupled to a markup library, the markup library comprising computer readable codes to render the first markup object or the second markup object in the thin client application.

6. The method of claim 5, wherein the computer readable codes comprise bindings for multiple types of thin client applications, and wherein the second document markup application is a type of thin client application.

7. The method of claim 1, wherein translating the first markup object to the second markup object comprises i) translating a portable document format (PDF) dictionary object to a browser-friendly markup object or ii) translating a browser-friendly markup object to a PDF dictionary object.

8. The method of claim 1, further comprising;
   determining, by the second document markup application, access to the second markup object received at the second document markup application based on the permission settings defined by the first document markup application.

9. A system for synchronizing a document markup modification across a plurality of devices, comprising:
   one or more processors;
   at least one non-transitory computer readable medium storing instructions which, when executed by the one or more processors, cause the one or more processors to perform a method comprising:
     subscribing to one or more events occurring in a first document markup application;
     receiving a notification indicating a modification to a document markup in the first document markup application, the document markup being a visual element overlaid on an underlying document and the modification being indicative of a change to the visual element, such that a modified document markup is formed by the first document markup application;
     receiving permission settings defined by the first document markup application representative of access limitations to the modified document markup based on an application receiving the modified document markup;
     extracting a first markup object representative of the modified document markup, that is generated and stored by the first document markup application, the first document markup application being one of a thick client application or a thin client application comprising a web-based document markup application;

translating the first markup object to a second markup object; and transmitting the second markup object and the permission settings to a second document markup application, the second document markup application being another of the thick client application or the thin client application comprising the web-based document markup application;

wherein the second markup object is accessible at the second document markup application in accordance with the permission settings, such that access to the second markup object at the second document markup application is defined by the first document markup application.

10. The system of claim 9, wherein translating the first markup object to the second markup object comprises i) translating a portable document format (PDF) dictionary object to a browser-friendly markup object or ii) translating a browser-friendly markup object to a PDF dictionary object.

11. The system of claim 9, wherein the first document markup application is the thick client application and the second document markup application is the thin client application comprising the web-based document markup application.

12. The system of claim 9, wherein the thin client application is coupled to a markup library, the markup library comprising computer readable codes to render the first markup object or the second markup object in the thin client application.

13. The system of claim 12, wherein the computer readable codes comprise bindings for multiple types of thin client applications, and wherein the second document markup application is a type of thin client application.

14. The system of claim 9, wherein one of the first markup object or the second markup object is determined to be more browser-compatible than another of the first markup object or the second markup object.

15. A non-transitory computer readable medium storing instructions that, when executed by one or more processors, cause the one or more processors to perform a method of synchronizing a document markup modification across a plurality of devices, the method comprising:

subscribing to one or more events occurring in a first document markup application;

receiving a notification indicating a modification to a document markup in the first document markup application, the document markup being a visual element overlaid on an underlying document and the modification being indicative of a change to the visual element, such that a modified document markup is formed by the first document markup application;

receiving permission settings defined by the first document markup application representative of access limitations to the modified document markup based on an application receiving the modified document markup;

extracting a first markup object representative of the modified document markup, that is generated and stored by the first document markup application, the first document markup application being one of a thick client application or a thin client application comprising a web-based document markup application;

translating the first markup object to a second markup object; and transmitting the second markup object and the permission settings to a second document markup application, the second document markup application being another of the thick client application or the thin client application comprising the web-based document markup application;

wherein the second markup object is accessible at the second document markup application in accordance with the permission settings, such that access to the second markup object at the second document markup application is defined by the first document markup application.

16. The non-transitory computer readable medium of claim 15, wherein one of the first markup object or the second markup object is determined to be more browser-compatible than another of the first markup object or the second markup object.

17. The non-transitory computer readable medium of claim 15, wherein the first markup object is extracted from i) an in-memory portable document format (PDF) representation of the modified document markup or ii) an in-memory JavaScript Object Notation (JSON) representation of the modified document markup.

18. The non-transitory computer readable medium of claim 15, wherein the first document markup application is the thick client application and the second document markup application is the thin client application comprising the web-based document markup application.

19. The non-transitory computer readable medium of claim 15, wherein translating the first markup object to the second markup object comprises i) translating a portable document format (PDF) dictionary object to a browser-friendly markup object or ii) translating a browser-friendly markup object to a PDF dictionary object.

20. The non-transitory computer readable medium of claim 15, wherein the thin client application is coupled to a markup library, the markup library comprising computer readable codes to render the first markup object or the second markup object in the thin client application.

* * * * *